United States Patent
Höglund et al.

(10) Patent No.: US 8,045,011 B2
(45) Date of Patent: Oct. 25, 2011

(54) IMAGING APPARATUS

(75) Inventors: Tobias Höglund, Linköping (SE);
Ognjan Hedberg, Linkëping (SE); Peter Hall, Linköping (SE)

(73) Assignee: Autoliv Development AB, Vargarda (SE)

( * ) Notice: Subject to any disclaimer, the term of this patent is extended or adjusted under 35 U.S.C. 154(b) by 672 days.

(21) Appl. No.: 12/114,542

(22) Filed: May 2, 2008

(65) Prior Publication Data

US 2008/0204571 A1 Aug. 28, 2008

Related U.S. Application Data

(63) Continuation of application No. PCT/SE2006/001212, filed on Oct. 27, 2006.

(30) Foreign Application Priority Data

Nov. 4, 2005 (GB) .................................. 0522594.1
Feb. 17, 2006 (GB) .................................. 0603255.1

(51) Int. Cl.
*H04N 5/225* (2006.01)
*H04N 7/18* (2006.01)

(52) U.S. Cl. ..................................... 348/216.1; 348/148

(58) Field of Classification Search .................. 348/246, 348/248, 255, 251, 149, 164, 216.1, 148, 348/222.1, 229.1
See application file for complete search history.

(56) References Cited

U.S. PATENT DOCUMENTS

| | | | |
|---|---|---|---|
| 4,718,028 A | | 1/1988 | Gussin et al. |
| 4,737,847 A | * | 4/1988 | Araki et al. .................. 348/161 |
| 5,341,219 A | * | 8/1994 | Schelen et al. ............. 348/217.1 |
| 5,629,988 A | | 5/1997 | Burt et al. |
| 7,340,164 B2 | * | 3/2008 | Charlet et al. .................. 398/30 |
| 2003/0067546 A1 | | 4/2003 | Asano |
| 2003/0095080 A1 | | 5/2003 | Colmenarez et al. |
| 2003/0142850 A1 | | 7/2003 | Eggers et al. |
| 2004/0066458 A1 | * | 4/2004 | Kawamura et al. ........ 348/216.1 |
| 2004/0136605 A1 | | 7/2004 | Seger et al. |
| 2006/0188246 A1 | * | 8/2006 | Terre et al. .................... 396/275 |

FOREIGN PATENT DOCUMENTS

| | | |
|---|---|---|
| DE | 100 16 184 A1 | 10/2001 |
| EP | 0 539 897 A2 | 10/1992 |
| EP | 0 542 091 A2 | 11/1992 |
| GB | 2 303 757 A | 2/1997 |
| GB | 1 383 083 A2 | 7/2003 |
| GB | 2 388 988 A | 11/2003 |

(Continued)

OTHER PUBLICATIONS

Great Britain Search Report dated Jan. 27, 2006.

(Continued)

*Primary Examiner* — David Ometz
*Assistant Examiner* — Ahmed A Berhan
(74) *Attorney, Agent, or Firm* — Brinks Hofer Gilson & Lione

(57) ABSTRACT

An imaging apparatus including an infrared video camera. The infrared video camera includes a sensor array operable to produce successive video images in the form of pixelated two-dimensional images. The imaging apparatus further comprises a processing arrangement operable to reduce or increase the overall brightness of an image in dependence upon the overall brightness of the pre-enhanced image and the overall brightness of the preceding enhanced image, so that the change in the overall brightness (DC-level) between the enhanced image and the preceding enhanced image is decreased.

6 Claims, 2 Drawing Sheets

FOREIGN PATENT DOCUMENTS

| | | |
|---|---|---|
| JP | 11-205636 | 7/1999 |
| JP | 2005274301 A * | 10/2005 |
| WO | WO 95/25322 | 9/1995 |
| WO | WO 2007/053075 A2 | 5/2007 |

OTHER PUBLICATIONS

Great Britain Search Report dated Apr. 25, 2006.
International Search Report for PCT/SE2006/001212 dated Mar. 28, 2007.
Burt, P. J: "A pyramid-based front-end processor for dynamic vision applications," Proceedings of the IEEE, Jul. 2002, ISSN 0018-9219, vol. 90, No. 7, pp. 1188-1200, see p. 1188, col. 2, line 3-line 10; p. 1192, col. 1, line 34-col. 2, line 8, figure 4, abstract.
Makarov, A: "Comparison of background extraction based intrusion detection algorithms." Proceedings of the International Conference on Image Processing (ICIP) Lausanne, Sep. 16-19, 1996, New York, IEEE, US, ISBN 0-7803-3259-8, vol. 1, pp. 521-524, see p. 522, col. 1, line 14-line 37, abstract.

* cited by examiner

IMAGING APPARATUS

CROSS REFERENCE TO RELATED APPLICATIONS

This application is a continuation of International Patent Application PCT/SE2006/001212 filed Oct. 27, 2006, and thereby claims the benefit of GB 0603255.1 filed Feb. 17, 2006 and GB 0522594.1 filed Nov. 4, 2005.

SUMMARY OF THE INVENTION

This disclosure relates to imaging means and in particular to the enhancement of images from electronic imaging means particularly, but not exclusively, the enhancement of such images which take the form of arrays of rows and columns of pixels and in which the brightness of any pixel or a brightness component of any pixel can be represented numerically, for example, digitally. The disclosure is particularly concerned with enhancement of video images in which a moving scene is represented, in known manner, by a series of briefly presented images or frames.

The disclosure concerns an infrared (IR) vision arrangement for automobiles in which an infrared camera mounted on the front of the vehicle. For example, the vision arrangement may be mounted on the front bumper or behind the windscreen, and views the area in front of the vehicle in infrared light. The vision arrangement produces corresponding video signals which, after processing, are used to drive a display visible to the driver, thus allowing the driver, in conditions of poor visibility in visible light, for example at night and/or in heavy rain or fog, to see the road ahead more clearly, and especially to see warm objects such as pedestrians or animals.

In developing an infrared video system of the kind referred to above for automotive purposes, the applicants have encountered certain problems. One such problem is that the change in overall brightness between successive images will become very large if the warm window of the camera is hit by a splash of water. In one of its aspects, this disclosure provides an image enhancing method, and a corresponding apparatus, to address such problems.

Accordingly, another aspect of the disclosure provides an imaging apparatus including an IR video camera comprising a sensor array that is operable to produce successive video images in the form of pixelated two-dimensional images. The imaging apparatus further comprises a processing arrangement operable to reduce or increase the overall brightness of an image in dependence upon the overall brightness of the pre-enhanced image and the overall brightness of the preceding enhanced image, so that the change in the overall brightness (DC-level) between the enhanced image and the preceding enhanced image is decreased to be less than the difference in overall brightness between the unenhanced image and the preceding enhanced image.

The brightness level of a new image is adjusted by adding, or multiplying by, a term or factor which is calculated from the overall brightness of the pre-enhanced new image and the overall brightness of the preceding image.

Preferably, the output at time t is calculated using $$f_{out}(x,y,t) = f(x,y,t) + \gamma \cdot DC_{residual}(t) \quad (1)$$

where $$DC_{residual}(t) = DC_{out}(t) - DC_f(t) \quad (2)$$

$DC_f(t)$ being the mean brightness of the input image and $$DC_{out}(t) = (1-\lambda) \cdot DC_{out}(t-1) + \lambda \cdot DC_f(t) \quad (3)$$

where $\gamma$ is a parameter controlling the strength of the compensation and $\lambda$ is a parameter determining the adaptation rate of the compensation.

Another aspect of the present invention provides a image enhancement method applicable to IR video images in which, for each video image, the overall brightness of an enhanced image is reduced or increased in dependence upon the overall brightness of the pre-enhanced image and the overall brightness of the preceding enhanced image.

A further aspect of the present invention provides an image enhancement method applicable to IR video images in which at least a fraction of the overall brightness of successive images from an IR video camera is low-pass filtered with respect to time.

Conveniently, the brightness level of a new image is adjusted by adding, or multiplying by, a term or factor which is calculated from the overall brightness of the pre-enhanced new image and the overall brightness of the preceding image.

Advantageously, the output at time t is calculated using $$f_{out}(x,y,t) = f(x,y,t) + \gamma \cdot DC_{residual}(t) \quad (1)$$

where $$DC_{residual}(t) = DC_{out}(t) - DC_f(t) \quad (2)$$

$DC_f(t)$ being the mean of the input image and $$DC_{out}(t) = (1-\lambda) \cdot DC_{out}(t-1) + \lambda \cdot DC_f(t) \quad (3)$$

where $\gamma$ is a parameter controlling the strength of the compensation and $\lambda$ is a parameter determining the adaptation rate of the compensation.

Preferably, the overall brightness level of an image is calculated as being, or as being proportional to, the average of the signal levels corresponding to each of the pixels in the frame.

Conveniently, the IR wavelengths observed fall within the far IR portion of the spectrum.

Another aspect of the disclosure provides a vehicle comprising an image enhancement apparatus according to the above.

BRIEF DESCRIPTION OF THE DRAWINGS

In order that the disclosure may be more readily understood, embodiments will now be described, by way of example, with reference to the accompanying drawings, in which.

DETAILED DESCRIPTION

Figure 1:
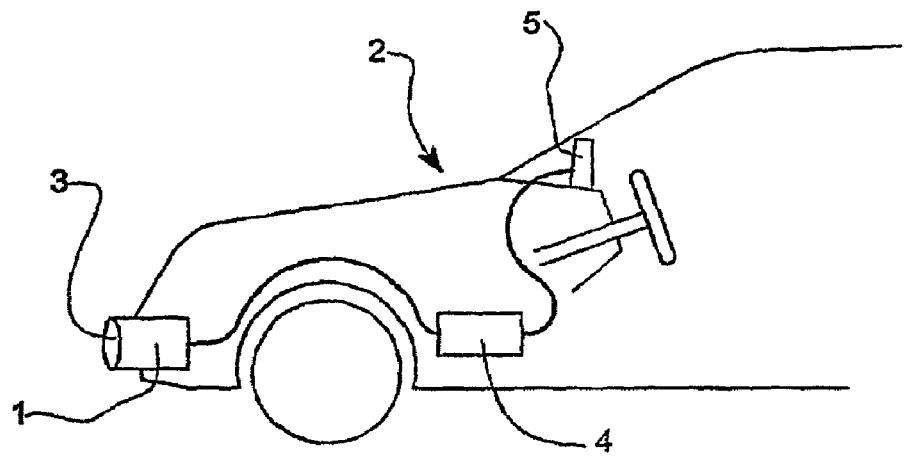
FIG. 1 is a diagram showing an automobile having an infrared video apparatus embodying the invention.

Referring to FIG. 1, an automobile infrared video system comprises an infrared camera 1 mounted at the front of a vehicle 2, for example on the bonnet or front bumper of the vehicle 2 protected from the environment by a window 3 which is transparent to infrared radiation. The infrared camera 1 preferably comprises a charge-coupled device (CCD) and, in known manner, provides electrical signals to a processor 4 which signals represent, digitally, respective instantaneous brightness values of respective pixels or picture elements of the image formed in the camera 1, such image being treated as a array of rows or columns of such pixels, in known manner. The camera 1 may, for example, provide 30 frames per second, each frame comprising such a two-dimensional array of pixels, comprising rows and columns of such pixels.

In preferred embodiments of the invention the wavelengths observed are in the "far" IR portions of the spectrum, i.e. wavelengths of between around 10 and 1000µ, or more particularly between around 25 and 350µ.

The processor 4 processes the signals, or at least the information in these signals, in the manner described below and provides, to a video display 5, driving signals such that the display 5 presents visibly to the viewer, an enhanced version of the scene viewed in infrared by the camera 1.

With an infrared video system as described above, without the image enhancement technique discussed below, there is a problem, as previously noted, in that, if the camera is mounted in front of the vehicle, and the warm window 3 of the camera 1 is hit by a splash of water, the water will be heated and the average intensity of the image "seen" by the camera 1 will rise suddenly. This problem may be alleviated by removing the "DC component" of the video signal, as mentioned above. One way of achieving this is by using a spatial high pass filter, however, simply removing the DC component would create other distortions of the image.

A better way to compensate for brightness "flashes" arising from water splashes is to modify the DC-level of each new image, by low pass filtering of the overall DC-level from one frame to the next.

For example, the overall brightness of a new image gathered by the camera 1 may be calculated as an average of the signal level of all or some of the pixels in the image. Alternatively, the overall brightness may be considered to be the total brightness of all or some of the image pixels. The raw data f(x,y,t) (where x and y designate horizontal and vertical directions on the array of pixels forming part of the CCD) output by the camera 1 may then be manipulated to give output data $f_{out}(x,y,t)$ using the following formula:

$$f_{out}(x,y,t)=f(x,y,t)+\gamma \cdot DC_{residual}(t) \quad (1)$$

where $$DC_{residual}(t)=DC_{out}(t)-DC_f(t) \quad (2)$$

$DC_f(t)$ being the mean brightness of the input image and $$DC_{out}(t)=(1-\lambda) \cdot DC_{out}(t-1)+\lambda \cdot DC_f(t) \quad (3)$$

$\gamma$ is a parameter which controls the strength of the flash compensation. If this parameter is set to 1, the DC-level will be $DC_{out}$. The adaptation rate of the flash compensation is determined by the parameter $\lambda$.

Equation (1) could also be written as:

$$f_{out}(x,y,t)=f(x,y,t)+\gamma \cdot (1-\lambda) \cdot (DC_{out}(t-1)-DC_f(t))$$

Figure 2:
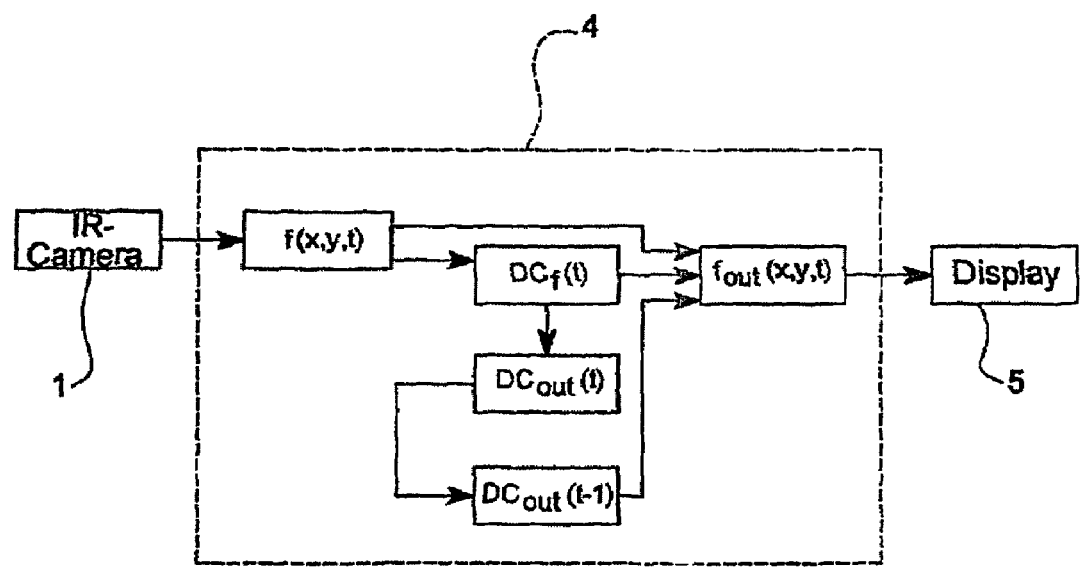
FIG. 2 is a block diagram of processing means forming part of the preferred embodiment of the invention.

FIG. 2 shows a block diagram of a processor 4 adapted to carry out this last equation.

In other words, the "raw" brightness of a new image to be displayed by the display is adjusted by adding a term ($\gamma \cdot DC_{residual}(t)$) which is dependent on the overall brightness of the unenhanced new image and of the previous (enhanced) image. $DC_{residual}(t)$ is calculated as being the difference between the overall brightness of the new (unenhanced) image and a further variable ($DC_{out}(t)$), which is the sum of a portion of this variable for the previous enhanced frame and a portion of the overall brightness of the unenhanced new frame. The sizes of these portions are preferably determined by multiplying the overall brightnesses by first and second respective coefficients. In preferred embodiments these coefficients add up to 1, and are equal to $(1-\lambda)$ and $\lambda$ respectively, where $\lambda$ is the adaptation rate parameter as mentioned above.

Figure 3:
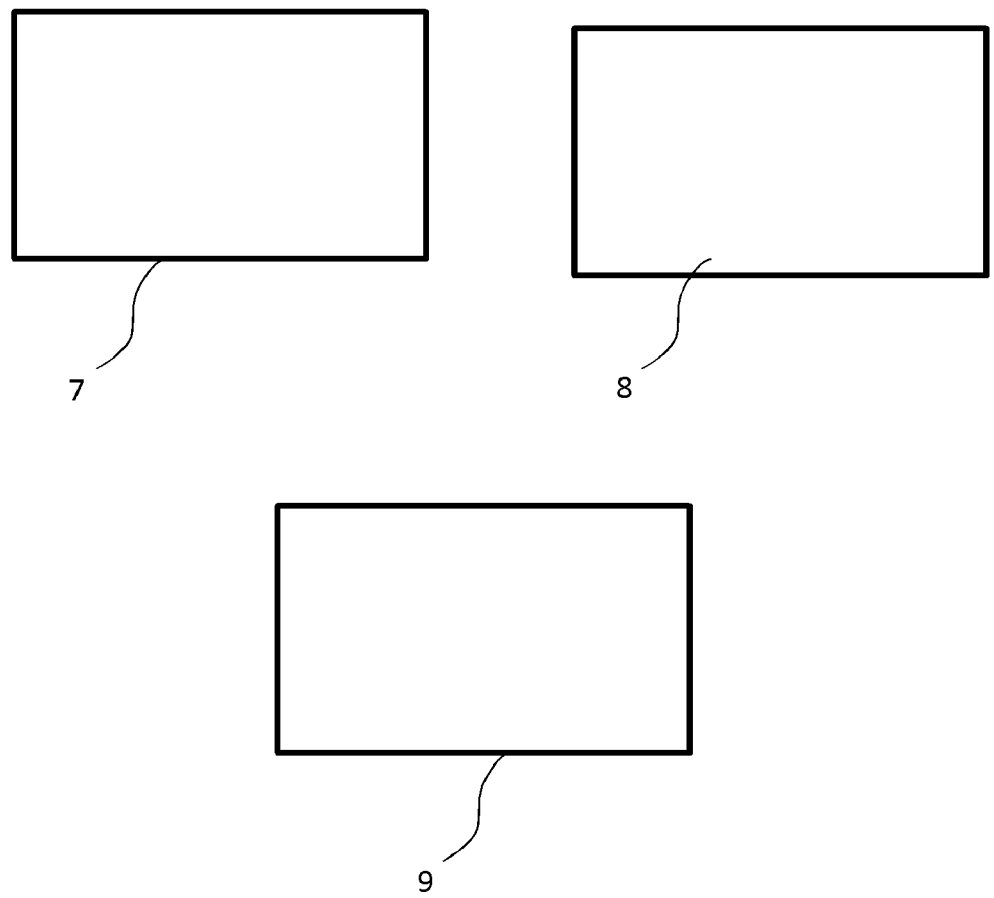
FIG. 3 is a block diagram of an enhanced image, a pre-enhanced image, and a preceding enhanced image.

Referring to FIGS. 2 and 3, the imaging apparatus includes an infrared video camera 1 comprising a sensor array and operable to produce successive video images in the form of pixelated two-dimensional images. The imaging apparatus further includes a processing arrangement 4 operable to reduce or increase an overall brightness of an enhanced image 7 in dependence upon an overall brightness of a pre-enhanced image 8 and an overall brightness of a preceding enhanced image 9, so that a change in the overall brightness between the enhanced image 7 and the preceding enhanced image 9 is decreased to be less than a difference in overall brightness between the pre-enhanced image 8 and the preceding enhanced image 9. The brightness level of the enhanced image 7 is adjusted by adding, or multiplying by, a term or factor which is calculated from the overall brightness of the pre-enhanced image 8 and the overall brightness of the preceding image 9.

In alternative embodiments, the "raw" overall brightness of a new image may be multiplied or divided by an appropriate factor, to adjust the overall brightness in the same way, and a skilled person will appreciate how this may be achieved.

Whichever technique is used, the effect is preferably to adjust the overall brightness of the new frame to be in between its "raw" overall brightness and the overall brightness of the previous, enhanced frame.

It will be appreciated that low pass temporal filtering of at least a fraction of the DC-level of the output images makes the output robust against sudden histogram shifts, for instance rain flashes, as discussed above.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An imaging apparatus including an infrared video camera comprising a sensor array and operable to produce successive video images in the form of pixelated two-dimensional images, the imaging apparatus further comprising a processing arrangement operable to reduce or increase an overall brightness of an enhanced image in dependence upon an overall brightness of a pre-enhanced image and an overall brightness of a preceding enhanced image, so that a change in the overall brightness between the enhanced image and the preceding enhanced image is decreased to be less than a difference in overall brightness between the pre-enhanced image and the preceding enhanced image;

wherein the output at time t is calculated using $$f_{out}(x,y,t)=f(x,y,t)+\gamma \cdot DC_{residual}(t) \quad (1)$$

where $$DC_{residual}(t)=DC_{out}(t)-DC_f(t) \quad (2)$$

$DC_f(t)$ being a mean brightness of the pre-enhanced image and $$DC_{out}(t)=(1-\lambda) \cdot DC_{out}(t-1)+\lambda \cdot DC_f(t) \quad (3)$$

where $\gamma$ is a parameter controlling a strength compensation and $\lambda$ is a parameter determining an adaptation rate of the compensation.

2. An imaging apparatus according to claim 1, wherein the overall brightness level of the enhanced image is adjusted by adding, or multiplying by, a term or factor which is calculated from the overall brightness of the pre-enhanced image and the overall brightness of a preceding image.

3. An apparatus according to claim 1, wherein an overall brightness level is calculated as being, or as being proportional to, an average of signal levels corresponding to each of a plurality of pixels in a frame.

4. An apparatus according to claim 1, wherein an infrared wavelengths observed fall within the far infrared portion of the spectrum.

5. An image enhancement method applicable to infrared video images characterised in that, for each video image received by a processor, an overall brightness of an enhanced image is reduced or increased by the processor in dependence upon an overall brightness of a pre-enhanced image and an overall brightness of a preceding enhanced image; wherein the output at time t is calculated using $$f_{out}(x,y,t) = f(x,y,t) + \gamma \cdot DC_{residual}(t) \quad (1)$$

where $$DC_{residual}(t) = DC_{out}(t) - DC_f(t) \quad (2)$$

$DC_f(t)$ being the mean of the pre-enhanced image and $$DC_{out}(t) = (1-\lambda) \cdot DC_{out}(t-1) + \lambda \cdot DC_f(t) \quad (3)$$

where $\gamma$ is a parameter controlling a strength compensation and $\lambda$ is a parameter determining an adaptation rate of the compensation.

6. A method according to claim 5, wherein an overall brightness level of a new image is adjusted by adding, or multiplying by, a term or factor which is calculated from the overall brightness of the pre-enhanced image and the overall brightness of the preceding enhanced image.

* * * * *